Patented Mar. 8, 1938

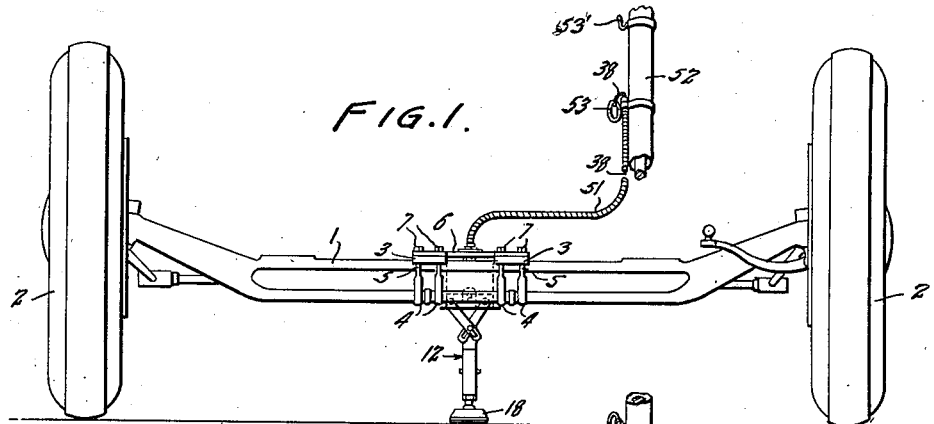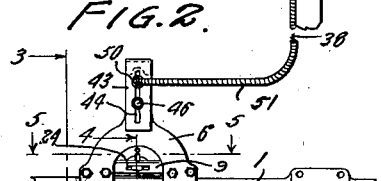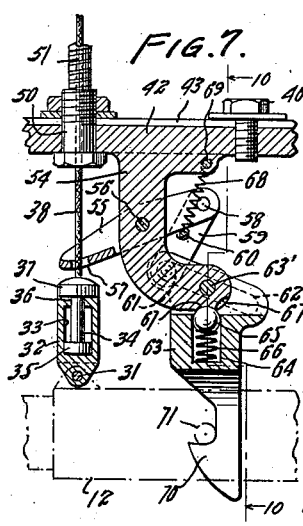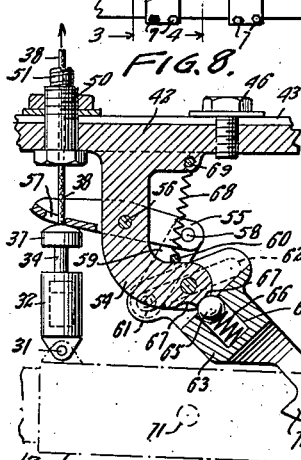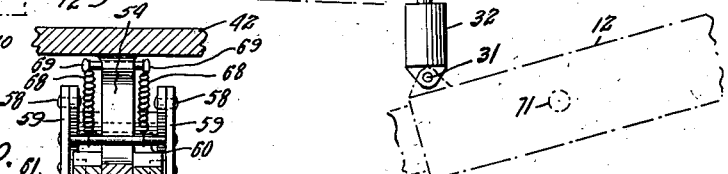

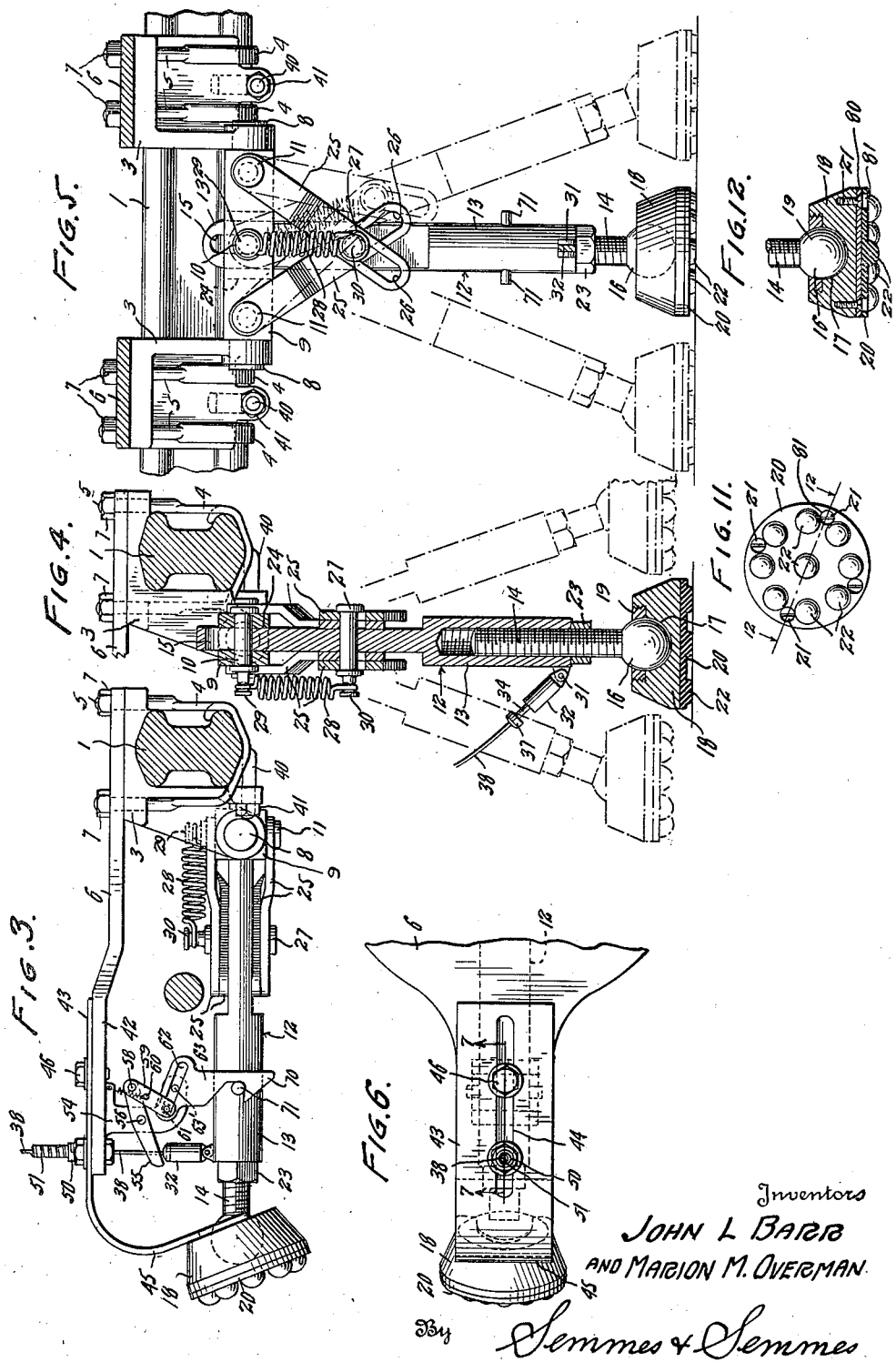

2,110,256

UNITED STATES PATENT OFFICE 2,110,256

DEVICE FOR FACILITATING THE TURNING OF STEERING WHEELS

John L. Barr, Chevy Chase, Md., and Marion M. Overman, Washington, D. C.; said Overman assignor to said Barr Application May 10, 1935, Serial No. 20,862
Renewed July 26, 1937

12 Claims. (Cl. 280—150)

This invention relates to devices for facilitating the turning of steering wheels of a vehicle.

The steering wheels of a vehicle can be more readily turned when the weight, at least in part, is relieved on them. The device which we have invented is of the type in which a lift element is let down from the vehicle and the vehicle under its own power is driven up on the lift element. The lift element does not actually have to raise the steering wheels from the ground. So long as the weight is relieved, the wheels can be more readily turned. The device shown in the drawings has been placed in the middle of the front axle of the car, but it can be placed to one side of this middle point, for if the weight is relieved on one wheel only, the turning of the steering wheels is facilitated.

The device has particular application where it is sought to park or unpark a car in a confined space.

When the lift element is lowered and the car driven up on it, if the wheels are cramped a twisting motion is imparted to the lift element and it is displaced laterally from its vertical position. This lateral motion shortens the effective length of the lift element between the axle of the car and the ground and tends to give an uneven lift.

It is an object of this invention to provide mechanism which is simple and strong and which will give substantially uniform lift to the steering wheel, or wheels, of a car when the device is operated.

A further object of the invention is to provide a latch mechanism for holding the lift element in its raised position and releasing it, which is simple and effective, easy to operate, and requires small repair or replacement.

With these and other objects in view, which may be incident to our improvements, the invention consists in the parts and combinations to be hereinafter set forth and claimed, with the understanding that the several necessary elements comprising the invention may be varied in construction, proportions and arrangement, without departing from the spirit and scope of the appended claims.

In order to make our invention more clearly understood, we have shown in the accompanying drawings means for carrying the same into practical effect without limiting the improvements in their useful applications to the particular constructions, which, for the purpose of explanation, have been made the subject of illustration.

In the drawings,

Figure 1 is a front elevation of a front axle of a car with our device in operative position with its foot in contact with the ground;

Figure 2 is a top plan view of the device, the front axle being shown as broken away;

Figure 3 is a view taken along the line 3—3 of Fig. 2, looking in the direction of the arrows;

Figure 4 is a view taken along the line 4—4 of Fig. 2, looking in the direction of the arrows;

Figure 5 is a view taken along the line 5—5 of Fig. 2, looking in the direction of the arrows;

Figure 6 is a detail view looking down on the latch mechanism from the top, showing the compression element in the raised position;

Figure 7 is a view taken along the line 7—7 of Fig. 6, looking in the direction of the arrows;

Figure 8 is a view similar to Fig. 7, showing the latch mechanism in the released position;

Figure 9 is a view similar to Fig. 7, showing the latch mechanism in released position and the compression element being lowered;

Figure 10 is a view taken along the line 10—10 of Fig. 7, looking in the direction of the arrows;

Figure 11 is a bottom plan view of a foot for our lift element;

Figure 12 is a view taken along the line 12—12 of Fig. 11, looking in the direction of the arrows.

Referring to the drawings, we have shown a front axle 1, carrying front steering wheels 2. Mounted on the front axle 1 is a support bracket 3 which is held by a U-clamp 4 to the front axle. The arms 5 of the U-clamp 4 pass through apertures in the bracket 3 and in a support 6. Bolts 7 hold the assembly in place.

There are two support brackets 3 (see Fig. 5) and two sets of U-clamps 4. The support 6 is bifurcated and passes over the arms 5 of the U-clamps 4 adjacent the top of each bracket 3.

In order to strengthen the hold of the brackets 3 on the front axle 1, we have provided clamp members 40 which fit around the axle (see Figs. 3 and 4), and which are fastened firmly against the bracket 3 by nuts 41.

Pivoted in the bracket 3 are the cylindrical ends 8 of a support bar 9. There is a pivot 10 carried in the middle of the support bar 9 and two pivots 11 on either side of the pivot 10. There is a lift or compression element 12 which has a female member 13 and male member 14. The female member is provided with a slot 15 which fits over the pivot 10.

The male member 14 of the lift element 12 is provided with a ball 16 which fits in socket 17 and foot piece 18. A holding ring 19 is screwthreaded into the top of foot piece 18 and holds the ball 16 in place. This arrangement permits universal pivoting of the foot piece 18 in the socket 17. Attached to the bottom of the foot piece 18 is a rubber pad 20 which may be held by means of vulcanizing to the foot piece 18 or by means of screws 21, as shown in Figs. 11 and 12. The rubber pad 20 is provided with downwardly extending projections 22 which give a firm grip on the surface of the roadway.

The length of the lift element can be adjusted by screwing the male member 14 up or down within the female member 13 of the lift 12. A holding nut 23 can be tightly screwed against the bottom of the female member 13 and acts as a lock nut to hold the parts in the desired position, once the adjustment of the length has been effected.

The female member 13 is adapted to slide within a slot 24 formed in the support bar 9. With the parts in the position shown in Fig. 5, when the lift element is perpendicular to support bar 9, the pivot 10 is at the bottom of the slot 15. Pivoted on pivots 11 are pivoted links 25. There are two pairs of pivoted links 25. These links 25 are provided with slots 26 in their lower ends which fit over a pivot 27 which passes through an aperture in the female member 13 of the lift element 12. With the parts in the position shown in Fig. 5 (unbroken line) the pivot 27 lies at the top of the slots 26 and the pivot 10 lies at the bottom of the slot 15. If the lift element 12 is transversely displaced, as indicated by the dotted lines in Fig. 5, the parts will assume a position in which one of the slots 26 will slide upwardly on the pivot 27 and the slot 15 will slide downwardly on pivot 10. This arrangement is such that there is substantially a uniform lift given to the front axle of the car, even when the lift element 12 is transversely displaced.

This substantially uniform lift is of great advantage for reasons heretofore set forth.

In Fig. 4, the lift element 12 is shown in dotted lines longitudinally displaced, pivotally on cylindrical end 8 of support bar 9. By this displacement, the end of the vehicle is raised and lowered, and the operator will apply his brakes when he feels he has obtained the requisite lift of the front wheels of the car.

In order to keep the lift element 12 centered as much as possible, and in order to insure non-rattling of the parts, we have provided a spring 28 which is attached to an extension 29 of the pivot 10 and to an extension 30 of the pivot 27. This spring is under tension and tends to hold the parts in the position shown in unbroken lines in Fig. 5.

In order to raise and lower the lift element 12, we have shown a pivot 31 to which is attached a cylindrical member 32 which has a cylindrical aperture 33 (see Fig. 7). In this cylindrical aperture slides a rod 34 having a head 35 which fits the aperture 33. The rod 34 passes through an aperture 36 in the upper portion of the member 32. Fixed to the rod 34 is a head 37 to which is attached a Bowden wire 38, or other flexible connection. By pulling up on, or releasing, the Bowden wire 38, the compression element may be raised or lowered.

The associated parts 32 to 37, inclusive, comprise a lost motion connection with the Bowden wire 38. The Bowden wire 38 is adapted to slide in a housing connection 50 which permits the wire to slide through the end 42 of the support 6. The wire is covered with a protective sheath 51 and extends upwardly to the steering past 52 of the car. The end of the wire 38 is provided with an operating hand ring 53 through which the compression element may be raised and held in place in its inoperative upper position on a hook 53', or released and lowered at will by the driver of the car.

The support 6 is provided with an extension 42 over which is adapted to fit an anti-rattle device 43 which is slotted as indicated at 44 (see Figs. 2 and 6). The anti-rattle device is a spring having a down-turned extension 45 which may be bifurcated, as shown in Fig. 6, to fit around the male member 14 of the lift element 12 and into contact with the top of the foot piece 18.

The anti-rattle device can be adjusted by means of a set bolt 46 carried by extension 42 of the support 6. This anti-rattle member, once adjusted, will contact against the top of the foot piece 18 in its up position and prevent rattling of the parts.

The extension 42 of the support 6 is provided with a downwardly extending support 54 on which is pivoted a trip lever 55 at 56. The trip 55 is provided with an aperture 57 through which is adapted to pass the Bowden wire 38. To the opposite end of the trip 55 are pivoted at 58 links 59 which are joined by a connecting bar 60 and which have at their ends pivot members 61 which are suitably attached to the ends of the arms 59. The pivot members 61 are adapted to slide in slots or grooves 62 formed in the top of a catch member 63 pivoted at 63' on the support 54.

The catch member 63 is provided with a central aperture 64 in which is housed a ball detent 65 which is spring pressed by means of spring 66 against the lower laterally extending surface of the support 54. The support 54 is provided with two cup-shaped apertures 67 in which the ball 65 is adapted to engage. The ball arrangement is such that the catch 63 is held either in the position shown in Fig. 7, or that of Fig. 8, after movement. The ball and cup-shaped recesses in which it falls yieldingly hold the catch in either one of the two positions shown.

Tension springs 68 pivoted at 69 are attached to the connecting rod 60 between the arms 59.

The catch 63 is provided at its end with hook members 70 carried on the bifurcated end of the catch 63. These hook members 70 are adapted to engage with projections 71 mounted on the lift element 12.

In the raised position of the lift element (when it is inoperative), the parts are in the position shown in Figs. 7 and 3, the ball 65 resting in the cup 67 which tends to hold the catch in contact with the lugs 71 on the lift element 12, the springs 68 tending to hold the operating lever 55 and links 59 in the position shown in these figures.

Let us assume that the driver wishes to lower the lift element. He pulls up on the ring 53 which raises head 37 on the rod 34 of the lost motion connection causing head 37 to strike the end of the trip 55, rocking it against tension of spring 68 and pushing down on the links 59 to move the catch into the position shown in Fig. 8. The operator then releases the ring 53 and allows the lift element 12 to fall, as shown in Fig. 9. In the meantime, the tension of the spring 68 has pulled the trip lever 55 into the position shown in Fig. 9, and the pivot elements 61 carried by the links have moved to the opposite end of the slot from their position in Fig. 8.

When the driver pulls up again on the Bowden wire 38, the head 37 of the lost motion connection will hit the trip 55 rocking it against tension of springs 68, pushing down on the catch 63 through links 59 and moving it back into the position shown in Fig. 7. Upon release of tension on the wire 38, the latch 55 will assume the position shown in Fig. 7, and head 37 will fall into the lowermost position.

In Figures 11 and 12 is shown a replaceable rubber pad 20. The pad 20 is fastened by cementing or vulcanizing to a metal disk 80 and is provided with countersunk apertures 81 for the reception of screws 21.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. A device to facilitate the turning of the steering wheels of a vehicle comprising a lift element mounted on the vehicle for both longitudinal and transverse movement and adapted to engage the roadway, a pivot on said element, pivoted links carried by the vehicle each having sliding engagement with the pivot on the pivot element, and stop means on each link engaging the pivot on the element whereby upon transverse displacement of the element the lift imparted thereby will remain substantially constant.

2. A device for facilitating the turning of the steering wheels of a vehicle comprising a lift element mounted on the vehicle for both longitudinal and transverse movement and adapted to engage the roadway, said element being adapted to move bodily downward with relation to the vehicle after contact with the roadway, a pivot on said element, pivoted links carried by the vehicle each having sliding engagement with the pivot on the pivot element, and stop means on each link engaging the pivot on the element whereby upon transverse displacement of the element the lift imparted thereby will remain substantially constant.

3. A device to facilitate the turning of the steering wheels of a vehicle comprising a lift element mounted on the vehicle for both longitudinal and transverse movement and adapted to engage the roadway, guide means on the vehicle in contact with the element to permit its bodily downward movement with relation to the vehicle after contact with the roadway, a pivot on said element, pivoted links carried by the vehicle each having sliding engagement with the pivot on the pivot element, and stop means on each link engaging the pivot on the element whereby upon transverse displacement of the element the lift imparted thereby will remain substantially constant.

4. A device to facilitate the turning of the steering wheels of a vehicle comprising a lift element mounted on the vehicle for both longitudinal and transverse movement and adapted to engage the roadway, a slot in the upper part of the element, a pivot carried by the vehicle in said slot, a pivot on said element, pivoted links carried by the vehicle each having sliding engagement with the pivot on the pivot element, and stop means on each link engaging the pivot on the element whereby upon transverse displacement of the element the lift imparted thereby will remain substantially constant.

5. A device to facilitate the turning of the steering wheels of a vehicle comprising a lift element mounted on the vehicle for both longitudinal and transverse movement and adapted to engage the roadway, a pivot on said element, pivoted links carried by the vehicle on either side of the element each having sliding engagement with the pivot on the pivot element, and stop means on each link engaging the pivot on the element whereby upon transverse displacement of the element the lift imparted thereby will remain substantially constant.

6. A device to facilitate the turning of the steering wheels of a vehicle comprising a lift element mounted on the vehicle for both longitudinal and transverse movement and adapted to engage the roadway, a pivot on said element, pivoted links carried by the vehicle on either side of the element, and slots in the links into which the pivot on the element engages, whereby upon transverse displacement of the element the lift imparted thereby will remain substantially constant.

7. A device to facilitate the turning of the steering wheels of a vehicle comprising a lift element mounted on the vehicle for both longitudinal and transverse movement and adapted to engage the roadway, a pivot on said element, a slot in the upper part of the element, a pivot carried by the vehicle engaging said slot in the element, pivoted links carried by the vehicle on either side of the element, and slots in the links into which the pivot on the element engages whereby upon transverse movement of the element the lift imparted thereby will remain substantially constant.

8. A device to facilitate the turning of the steering wheels of a vehicle comprising a lift element mounted on the vehicle for both longitudinal and transverse movement and adapted to engage the roadway, a pivot on said element, pivoted links carried by the vehicle each having sliding engagement with the pivot on the pivot element, stop means on each link engaging the pivot on the element whereby upon transverse displacement of the element the lift imparted thereby will remain substantially constant, and a pivot on the vehicle for the lift element permitting forward and backward movement of the element so that the vehicle can be driven upon the element by either forward or backward movement of the vehicle.

9. A device to facilitate the turning of the steering wheels of a vehicle comprising a lift element mounted on the vehicle for both longitudinal and transverse movement and adapted to engage the roadway, a pivot on said element, pivoted links carried by the vehicle on either side of the element, each having sliding engagement with the pivot on the pivot element, stop means on each link engaging the pivot on the element whereby upon transverse displacement of the element the lift imparted thereby will remain substantially constant, and a pivot on the vehicle for the lift element permitting forward and backward movement of the element so that the vehicle can be driven upon the element by either forward or backward movement of the vehicle.

10. A device to facilitate the turning of the steering wheels of a vehicle comprising a lift element mounted on the vehicle for both longitudinal and transverse movement and adapted to engage the roadway, a pivot on said element, pivoted links carried by the vehicle on either side of the element, slots in the links into which the pivot on the element engages, whereby upon transverse displacement of the element the lift imparted thereby will remain substantially constant, and a pivot on the vehicle for the lift element permitting forward and backward movement of the element so that the vehicle can be driven upon the element by either forward or backward movement of the vehicle.

11. A device to facilitate the turning of the steering wheels of a vehicle comprising a lift element adapted to engage the roadway, a pivot on said element, a slot in the upper part of the element, a pivot carried by the vehicle engaging said slot in the element, pivoted links carried by the vehicle on either side of the element, slots in the links into which the pivot on the element engages whereby upon transverse movement of the element the lift imparted thereby will remain substantially constant, and a pivot on the vehicle for the lift element permitting forward and backward movement of the element so that the vehicle can be driven upon the element by either forward or backward movement of the vehicle.

12. In a device to facilitate the turning of the steering wheels of a vehicle, the combination of a lift element mounted on the vehicle for both longitudinal and transverse movement and adapted to engage the roadway, a pivot on said element, pivoted links carried by the vehicle each having sliding engagement with the pivot on the pivot element, stop means on each link engaging the pivot on the element whereby upon transverse displacement of the element the lift imparted thereby will remain substantially constant, a pivoted catch adapted to engage the lift element, means to pivot the catch, and means to yieldingly hold the catch in the on and off position.

JOHN L. BARR.
MARION M. OVERMAN.